(12) United States Patent
Stephenson

(10) Patent No.: US 10,981,233 B2
(45) Date of Patent: Apr. 20, 2021

(54) MECHANICAL ROUGHENING BY A TOOL WITH TRANSLATABLE SWAGING BLADES

(71) Applicant: Ford Motor Company, Dearborn, MI (US)

(72) Inventor: David Alan Stephenson, Detroit, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 16/486,961

(22) PCT Filed: Feb. 21, 2017

(86) PCT No.: PCT/US2017/018651
§ 371 (c)(1),
(2) Date: Aug. 19, 2019

(87) PCT Pub. No.: WO2018/156098
PCT Pub. Date: Aug. 30, 2018

(65) Prior Publication Data
US 2020/0230839 A1 Jul. 23, 2020

(51) Int. Cl.
*B23B 41/12* (2006.01)
*B23C 3/34* (2006.01)
(Continued)

(52) U.S. Cl.
CPC ............. *B23B 41/12* (2013.01); *B23C 3/34* (2013.01); *B23C 5/18* (2013.01);
(Continued)

(58) Field of Classification Search
CPC .. B23B 41/12; B23C 3/34; B23C 5/18; Y10T 408/375
See application file for complete search history.

(56) References Cited

U.S. PATENT DOCUMENTS 294,484 A * 3/1884 Malmedie ......... B23B 29/03446
408/161
3,405,049 A * 10/1968 Czubak .................. B24B 33/08
204/217
(Continued)

FOREIGN PATENT DOCUMENTS

CN 1871090 A 11/2006
CN 101264533 A 9/2008
(Continued)

OTHER PUBLICATIONS

International Search Report for PCT/US2017/018643 dated May 23, 2017, 2 pages.
(Continued)

*Primary Examiner* — Eric A. Gates
(74) *Attorney, Agent, or Firm* — Vincent Mastrogiacomo; Brooks Kushman P.C.

(57) ABSTRACT

A method includes positioning a cylindrical tool having one or more rows of blades within a cylindrical bore having a surface, forming annular grooves and peaks into the surface with the grooving blades when the swaging blades are in the retracted position, and translating the swaging blades from the retracted position to the extended position to deform the peaks. The one or more rows of blades includes fixed grooving blades and translatable swaging blades having retracted and extended positions.

18 Claims, 5 Drawing Sheets

(51) Int. Cl.
   *B23C 5/18*      (2006.01)
   *C23C 4/02*      (2006.01)
(52) U.S. Cl.
   CPC ..... *B23B 2220/123* (2013.01); *B23B 2220/44* (2013.01); *B23C 2215/242* (2013.01); *B23C 2222/04* (2013.01); *B23C 2222/52* (2013.01); *C23C 4/02* (2013.01); *Y10T 407/1914* (2015.01); *Y10T 407/23* (2015.01); *Y10T 408/375* (2015.01); *Y10T 409/307616* (2015.01)

(56) References Cited

U.S. PATENT DOCUMENTS

| | | | | |
|---|---|---|---|---|
| 4,105,360 | A * | 8/1978 | Keller | B23B 29/034 408/118 |
| 4,224,846 | A * | 9/1980 | Eysel | B23B 29/03457 408/147 |
| 4,508,475 | A * | 4/1985 | Peuterbaugh | B23B 29/03446 408/153 |
| 4,615,652 | A * | 10/1986 | Van Sickle | B23B 29/03432 408/161 |
| 4,867,619 | A * | 9/1989 | Briggs | B23B 29/03457 408/158 |
| 4,941,782 | A * | 7/1990 | Cook | B23B 29/03457 408/147 |
| 5,010,955 | A | 4/1991 | Springer | |
| 5,012,863 | A | 5/1991 | Springer | |
| 5,427,480 | A * | 6/1995 | Stephens | B23B 29/03457 408/156 |
| 5,857,813 | A * | 1/1999 | Kress | B23B 29/03446 408/1 R |
| 6,238,150 | B1 | 5/2001 | Yamada et al. | |
| 6,312,200 | B1 * | 11/2001 | Graham | B23B 29/03446 408/1 R |
| 6,585,564 | B1 | 7/2003 | Hiramoto et al. | |
| 7,217,070 | B2 | 5/2007 | Hecht | |
| 7,607,209 | B2 | 10/2009 | Iizumi et al. | |
| 9,382,868 | B2 | 7/2016 | Stephenson et al. | |
| 2004/0194592 | A1 | 10/2004 | Feil et al. | |
| 2008/0245226 | A1 | 10/2008 | Iizumi et al. | |
| 2008/0245227 | A1 | 10/2008 | Iizumi et al. | |
| 2008/0260958 | A1 | 10/2008 | Sekikawa et al. | |
| 2010/0031799 | A1 | 2/2010 | Ast et al. | |
| 2010/0101526 | A1 | 4/2010 | Schaefer et al. | |
| 2010/0326270 | A1 | 12/2010 | Doerfler et al. | |
| 2011/0030663 | A1 | 2/2011 | Verpoort et al. | |
| 2013/0047947 | A1 | 2/2013 | Whitbeck et al. | |
| 2013/0199490 | A1 | 8/2013 | Schramm et al. | |
| 2013/0291823 | A1 | 11/2013 | Whitbeck et al. | |
| 2014/0010977 | A1 | 1/2014 | Whitbeck et al. | |
| 2014/0050544 | A1 | 2/2014 | Nedzlek et al. | |
| 2014/0216388 | A1 | 8/2014 | Strandburg, III et al. | |
| 2014/0227046 | A1 | 8/2014 | Ast et al. | |
| 2014/0360355 | A1 | 12/2014 | Whitbeck et al. | |
| 2014/0364042 | A1 | 12/2014 | Whitbeck et al. | |
| 2015/0082850 | A1 | 3/2015 | Flores et al. | |
| 2015/0292432 | A1 | 10/2015 | Stephenson et al. | |
| 2015/0352683 | A1 | 12/2015 | McDowell et al. | |
| 2016/0208370 | A1 | 6/2016 | Bauer et al. | |
| 2016/0193626 | A1 | 7/2016 | Wagener et al. | |
| 2020/0001380 | A1 * | 1/2020 | Stephenson | B23C 3/34 |

FOREIGN PATENT DOCUMENTS

| | | | |
|---|---|---|---|
| CN | 201338219 Y | 11/2009 | |
| CN | 202388017 U | 8/2012 | |
| CN | 103056402 A | 4/2013 | |
| DE | 4022579 A1 * | 1/1991 | ....... B23B 29/03457 |
| DE | 4402503 A1 * | 8/1995 | ....... B23B 29/03417 |
| FR | 2973267 B1 | 10/2012 | |
| GB | 979803 B1 | 1/1965 | |
| JP | 11010414 A * | 1/1999 | |
| JP | 2007283469 A * | 11/2007 | |
| JP | 2008137117 A | 6/2008 | |
| JP | 2009095918 A | 5/2009 | |

OTHER PUBLICATIONS

International Search Report for PCT/US2017/018651 dated May 11, 2017, 2 pages.
First Office Action for Chinese Application No. 201780086959.3, dated Apr. 23, 2020, 13 Pages.
First Office Action for Chinese Application No. 201780087018.1, dated Apr. 29, 2020, 11 Pages.

* cited by examiner

MECHANICAL ROUGHENING BY A TOOL WITH TRANSLATABLE SWAGING BLADES

TECHNICAL FIELD

The present disclosure relates to a method for roughening surfaces of cylinder bores.

BACKGROUND

Cylinder bores of aluminum engine blocks, where an engine piston travels, may be treated with a thin layer of thermally sprayed steel for wear resistance. The cylinder bore surface is often machined, by mechanical roughening, to provide surface roughness to facilitate bonding of the steel coating. A grooving tool may be used to roughen a surface by cutting a series of grooves into the substrate. A rotary swage-wiper (swaging) tool then can deform the groove tops to produce an undercut. The use of the grooving and swiper/swager tools results in positional and orientation errors due to the intermediate tool change, a heavier nominal deformation, tool run out, and/or swiping depth variation resulting in voids and unevenness in the thermal spray coating.

SUMMARY

According to an embodiment, a method includes positioning a cylindrical tool having one or more rows of blades including fixed grooving blades and translatable swaging blades having retracted and extended positions within a cylindrical bore having a surface. The method further includes forming annular grooves and peaks into the surface with the grooving blades when the swaging blades are in the retracted position, and translating the swaging blades from the retracted position to the extended position to deform the peaks.

In one or more embodiments, the method may further include translating the swaging blades from the extended position to the retracted position after the peaks are deformed. Each deformed peak may include an undercut. The method may further include actuating an actuator configured to translate the swaging blades between the retracted position to the extended position. The method may also include translating the swaging blades to the extended position such that a distal end of each of the swaging blades extends beyond a distal end of each of the grooving blades.

According to an embodiment, a method includes positioning a cylindrical tool having translatable swaging blades and grooving blades at an axial location along the length of a cylinder bore having a surface, forming grooves and peaks into the surface with the grooving blades when the swaging blades are in the retracted position at the axial location, and deforming the peaks with the swaging blades when the swaging blades are in the extended position at the axial location.

In one or more embodiments, the method may further include translating the swaging blades between the retracted and extended position after the forming step. The method may further include actuating an actuator configured to translate the swaging blades between the retracted position and the extended position. The method may include translating the swaging blades to the extended position such that a distal end of each of the swaging blades extends beyond a distal end of each of the grooving blades. The method may also include removing the tool from the cylinder bore after the deforming step.

According to an embodiment, a method includes positioning a cylindrical tool having one or more rows of elements including grooving elements and swaging elements, one of the grooving elements and swaging elements being translatable between a retracted position to an extended position, forming grooves into a cylindrical surface with the grooving elements to form peaks therebetween, and deforming the peaks with the swaging elements.

In one or more embodiments, the swaging elements may be translatable. The grooves may be formed when the swaging elements are in the retracted position. The method may further include translating the swaging elements to the retracted position after the deforming step. In another embodiment, the grooving elements may be translatable. The peaks may be deformed when the grooving elements are in the retracted position. The method may further include translating the grooving elements to the extended position after the deforming step. In one or more embodiments, the method may further include maintaining the tool at an axial location along the length of a cylinder bore during the forming and deforming steps. The method may further include translating one of the grooving elements and swaging elements having the retracted and extended positions by actuating an actuator located on the tool. The grooving and swaging elements in each row may be positioned along a circumference of the tool.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Automotive engine blocks include a number of cylindrical engine bores. Cylinder bores may be formed and defined by a cylindrical wall of metal material, including steel iron, and aluminum. In certain instances, cylinder bores formed from and defined by relatively light weight metals, such as aluminum or magnesium, may be used instead of steel or iron cylinder bores to reduce engine size and/or weight and improve engine power output and fuel economy. When aluminum is used to construct such blocks, certain processes are known to enhance strength and wear resistance of the aluminum engine cylinder bores.

The inner surface of each engine bore is machined so that the surface is suitable for use in automotive applications, e.g., exhibits suitable wear resistance and strength. Internal cylindrical surfaces where an engine piston travels may be treated to provide surface roughness to facilitate bonding to a later applied metallic coating. The machining process may include roughening the inner surface, subsequently applying the metallic coating to the roughened surface, and honing the metallic coating to obtain a finished inner surface with the requisite strength and wear resistance. A metallic coating may be applied using thermal spraying. Alternatively, a liner material having requisite strength and wear resistance characteristics may be applied to the unfinished inner surface of the engine bore.

Figure 1:
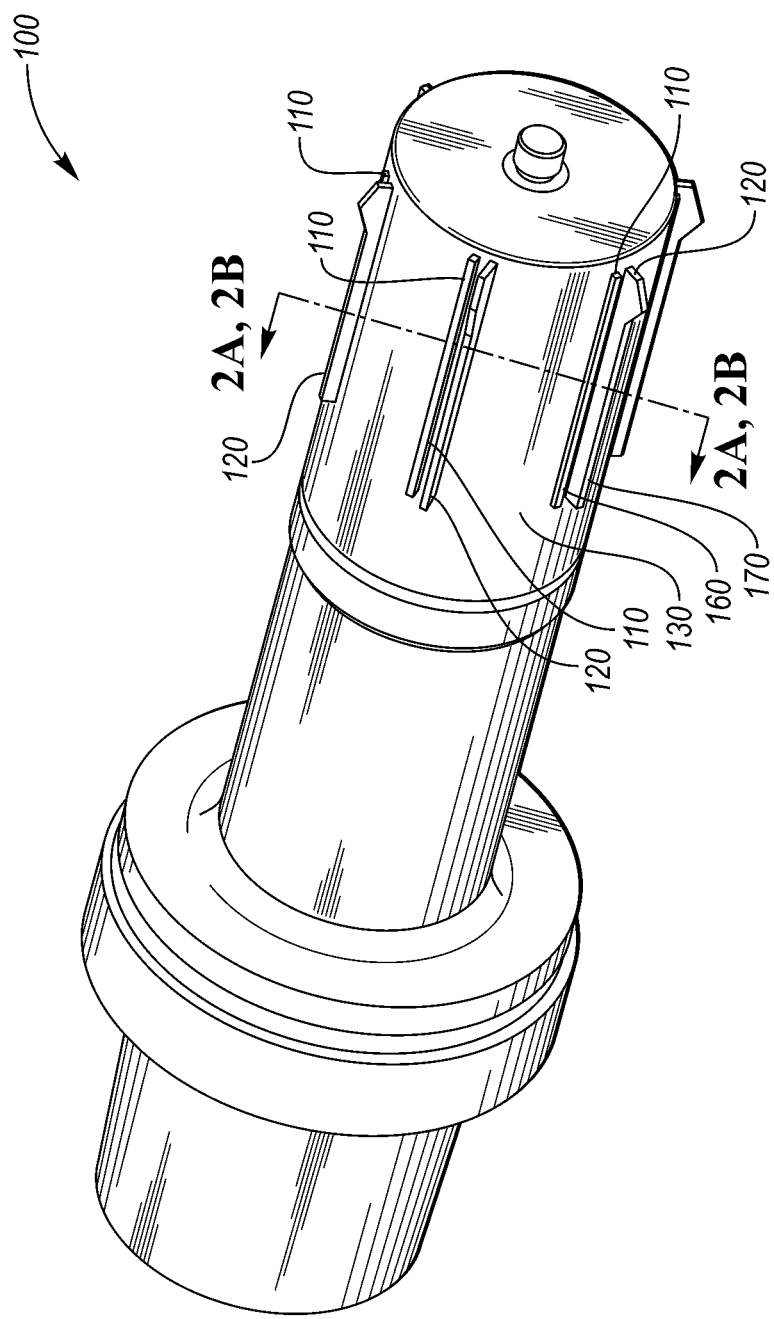
FIG. 1 depicts a perspective view of the surface roughening tool showing the grooving blades and swaging blades with the swaging blades extended.

FIG. 1 depicts a surface roughening tool 100 for roughening the surface of a cylinder bore to improve bonding of a thermally sprayed coating. Generally, the tool 100 is held in a holder fastened to a tool spindle (not shown). The spindle may be either a box or motorized spindle. The tool 100 is used to produce grooves into the surface of the cylinder bore, which run in the circumferential direction of the cylinder bore, as the tool 100 is lowered into the cylinder bore. The profile produced on the surface has grooves with intermediate ridges, or peaks, in between. The tool spindle has an axis of rotation parallel to the cylinder bore axis. The longitudinal axis of the tool (along the length) is offset from the cylinder bore axis. The tool rotates in the spindle about the tool axis at an angular speed, and precesses around the bore axis at a separate angular speed. The precession around the axis is referred to as circular interpolation. The tool 100 interpolates such that the tool blades rotate and move simultaneously in a circular path around the cylinder bore surface, moving down the length of the cylinder bore. This permits machining of grooves in any bore with a diameter larger than the tool 100 such that bores of different diameters can be cut with the same tool. The interpolation movement permits the formation of a pocket and the annular parallel grooves within the inner surface of the cylinder bore. The interpolation of the tool is discussed in U.S. patent application Ser. No. 13/913,865, filed on Jun. 10, 2013, and Ser. No. 13/461,160, filed on May 1, 2012, which are incorporated by reference herein in their entirety.

The grooving blades 110, or grooving elements, are projecting radially outward from the tool 100 on tool body 130, and are configured to cut into the surface to form the grooves and peaks. Cylindrical tool body 130 may be formed of steel or cemented tungsten carbide. The grooving elements 110 may be dispersed in one or more axial rows along the length of the tool 100 to provide a cutting edge. Grooving blades 110 have a distal end 160 and may be dispersed around the circumference of the tool body 130 and along the longitudinal axis of the tool 100 to form a desired profile of grooves and peaks within the cylinder bore. In a non-limiting example, grooving blades 110 are equally radially spaced apart from adjacent grooving blades 110. Any number of grooving blades 110 may be used. The grooving blades 110 may be formed of rows of grooving elements brazed end to end to form a long cutting edge. The grooving blades 110 may be formed of a cutting material suitable for machining aluminum or magnesium alloy. The considerations for selecting such materials include without limitation chemical compatibility and/or hardness. Non-limiting examples of such materials include, without limitation, high speed steel, sintered tungsten carbide or polycrystalline diamond. The grooving blades and elements may also include pocket cutting elements.

The surface roughening tool 100 also includes swaging blades 120, or swaging elements, which deform the peaks formed by the grooving blades 110 to produce an undercut on the peaks. The swaging elements may also be referred to as swiping elements because the tool used for deformation may be a swiper (swage/wiper). The resulting profile may be a dovetail type shape of the peaks. The swaging blades are dispersed corresponding to the grooving blades 110 such that the swaging blades 120 can deform the peaks formed by the grooving blades 110. The swaging elements 110 may be dispersed in one or more axial rows along the length of the tool 100 to provide a cutting edge. The swaging blades 120 may be formed of swaging elements brazed end to end to form a long cutting edge. The swaging blades may be dispersed around the circumference of the tool body 130 as well as along the longitudinal axis of the tool 100 to form the desired profile of grooves and undercut peaks within the cylinder bore. The swaging blades 120 are capable of projecting radially outward from the tool 100, beyond the grooving blades 110, and may also be storable in a recess of the tool body 130. The swaging blades 110 may be formed of a cutting material suitable for machining aluminum or magnesium alloy. The considerations for selecting such materials include without limitation chemical compatibility and/or hardness. A non-limiting example of the swaging blades 120 includes polycrystalline diamond.

Figure 2A:
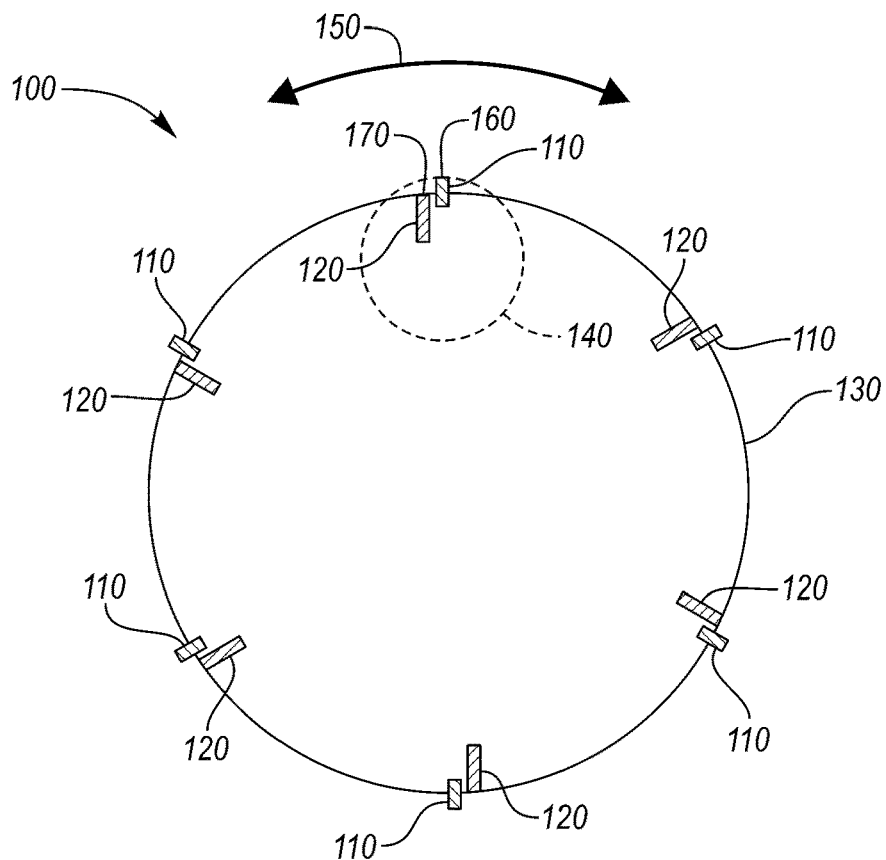
FIG. 2A depicts a partial cross-section of the swaging blades and grooving blades of FIG. 1 taken along line 2A, 2B with the swaging blades retracted.
Figure 2B:
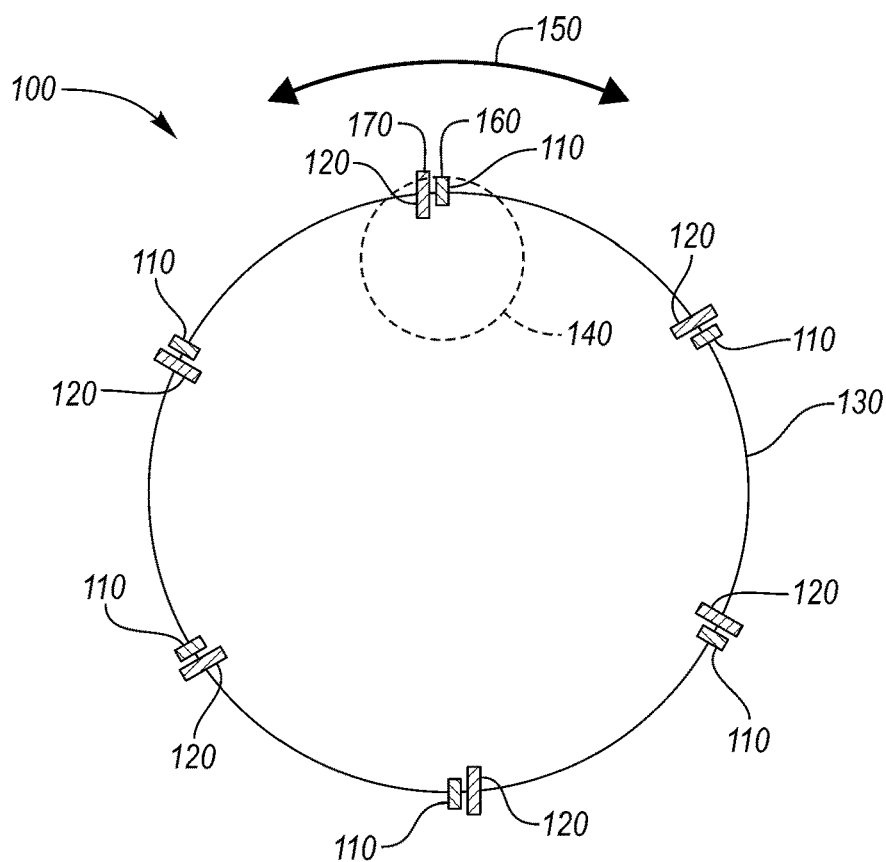
FIG. 2B depicts a partial cross-section of the swaging blades and grooving blades of FIG. 1 taken along line 2A, 2B with the swaging blades extended.

FIGS. 2A and 2B show a cross section of the tool taken along line 2A, 2B. Swaging blades 120 are translatable between a retracted position and an extended position, as shown in FIGS. 2A and 2B, respectively. When the swaging blades 120 are in the retracted position, the blades 120 are wholly or partially stored in a recess in the tool body 130 such that the cutting edge of the swaging blades 120 are not in contact with the cylinder bore surface. Distal end 160 of each grooving blade 110 cutting edge extends beyond the distal end 170 of the swaging blade 120 such that the grooving blade 110 can cut the grooves and peaks into the cylinder bore when the swaging blade 120 is in the retracted position. After the grooves and peaks have been cut, the swaging blades 120 translate to the extended position during rotation 150 such that distal end 170 of the swaging blade 120 extends radially outwardly beyond the distal end 160 of grooving blade 110. The distal end 160 of the grooving blade 110 sets a circumference 140 such that the distal end 170 of the swaging blade 120 extends beyond this circumference 140 when in the extended position.

Although FIGS. 2A and 2B show that the swaging blades 120 are translatable between a retracted position and an extended position, in certain other instances the grooving elements 110 may be translatable, or both sets of blades may be translatable, to roughen the surface by producing grooves and peaks, and deforming the peaks thereafter. Similarly, the orientation of the grooving blades 110 and swaging blades 120 with respect to the tool rotation 150 may be reversed, as well as the tool rotation itself.

Figure 3B:
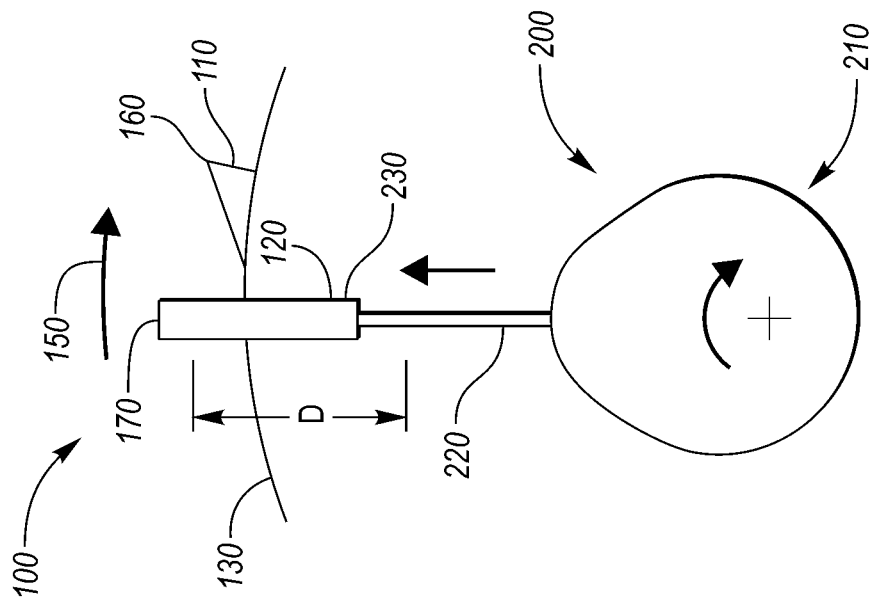
FIG. 3B depicts a partial and isolated schematic view of the surface roughening tool of with the swaging blade extended.
Figure 3A:
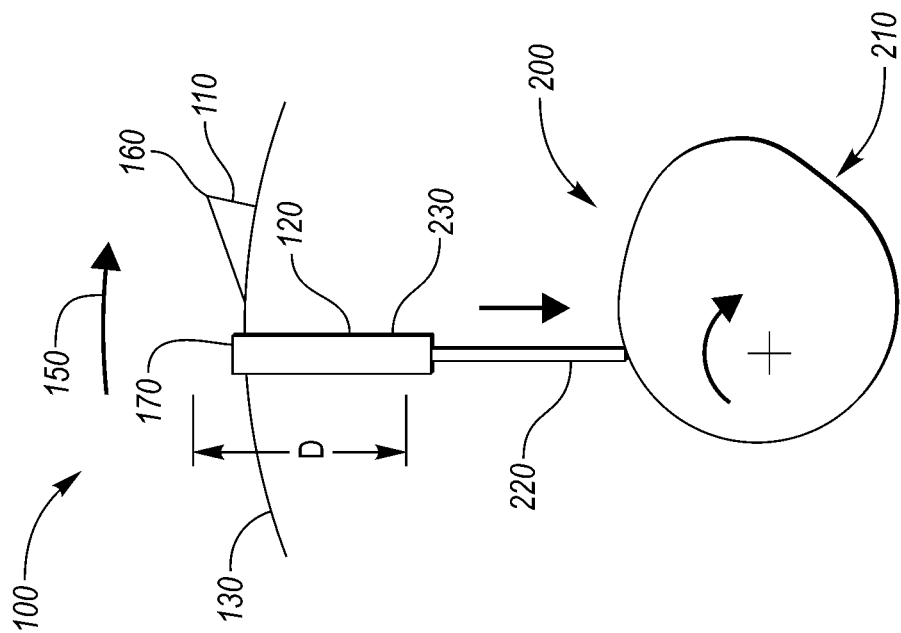
FIG. 3A depicts a partial and isolated schematic view of the surface roughening tool with the swaging blade retracted.

FIGS. 3A and 3B depict an enlarged partial view of the surface roughening tool 100. Distance D shows the distance swaging blade 120 translates for the distal end 170 of the swaging blade 120 to extend past the distal end 160 of the grooving blade 110. Swaging blade 120 is translated by an actuator 200. The actuator 200 may utilize an eccentric cam, cone and wedge, screw mechanism, or any similar mechanism. The actuator 200 in some instances includes an elongated member 220 connected to a cam 210 for translating the swaging blade 120. The elongated member 220 is connected to a cartridge 230 which stores the swaging blade 120 in the recess of the tool body. As the tool 100 rotates through a fixed angle in direction 150, cam 210 moves the elongated member 220 to push the cartridge 230 to translate the swaging blade 120 out of the tool body 130 to the extended position.

Figure 4A:
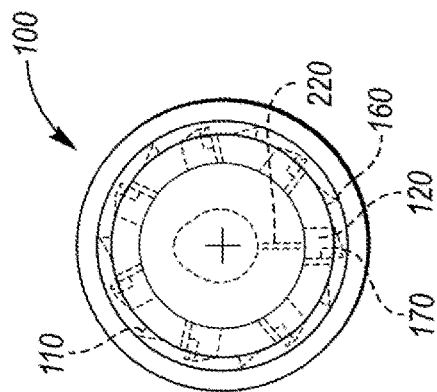
FIG. 4A is a side view of the surface roughening tool depicting one swaging blade retracted according to one or more embodiments.
Figure 4B:
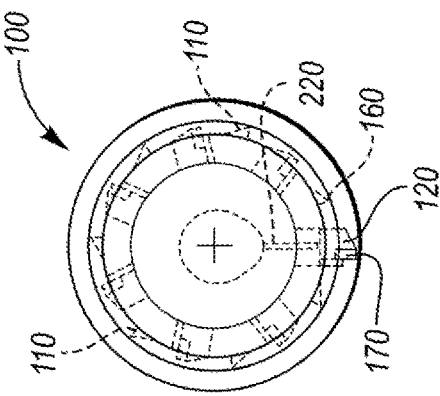
FIG. 4B is a top view of the surface roughening tool depicting one swaging blade retracted according to one or more embodiments.
Figure 5A:
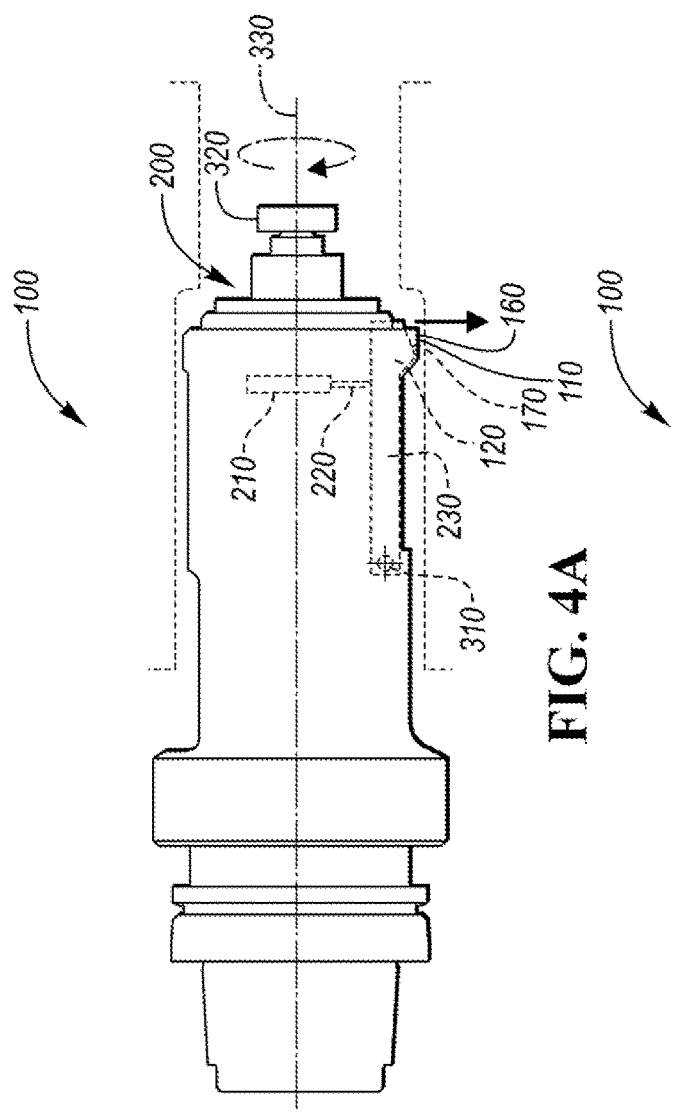
FIG. 5A is a side view of the surface roughening tool depicting one swaging blade extended according to one or more embodiments.
Figure 5B:
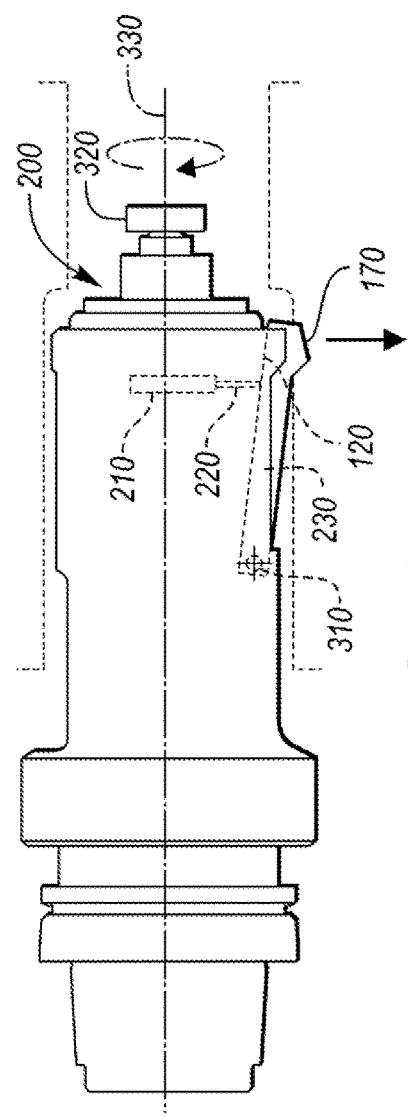
FIG. 5B is a top view of the surface roughening tool depicting one swaging blade extended according to one or more embodiments.
Figure 6:
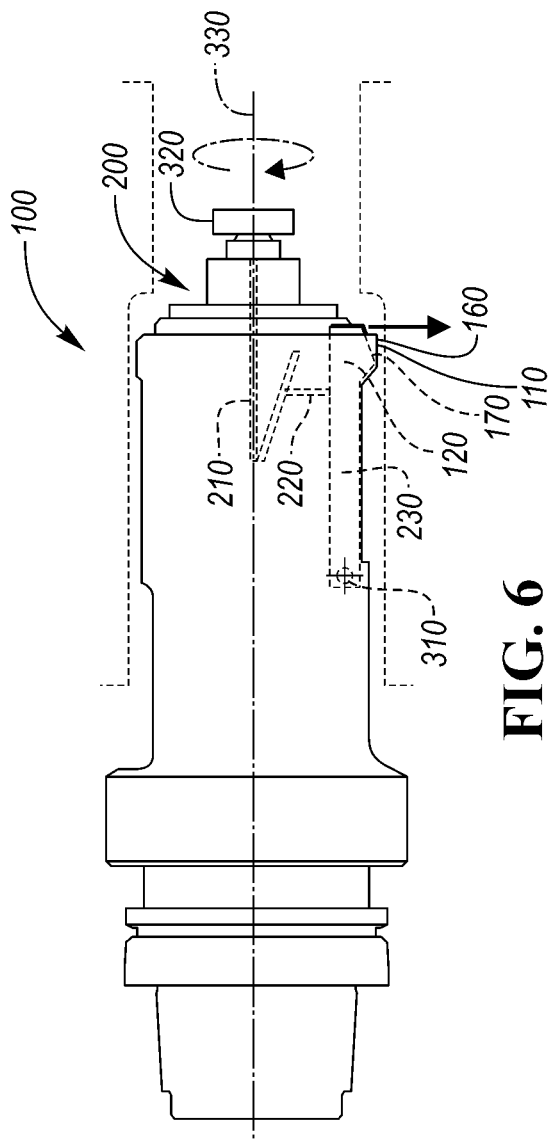
FIG. 6 is a side view of the surface roughening tool according to one or more embodiments.
Figure 7:
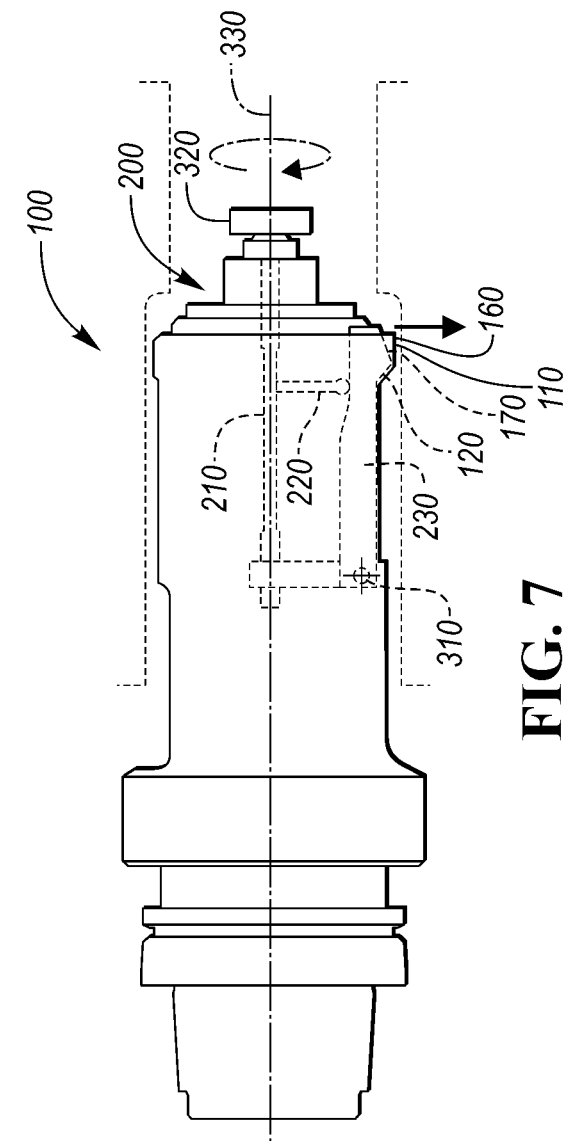
FIG. 7 is a side view of the surface roughening tool according to one or more embodiments.

FIGS. 4A-B, 5A-B, and 6-7 show schematics of tool 100 utilizing various actuators 200, such as a cam, screw, or cone and wedge. As shown in FIGS. 4A-B, 5-AB, and 6-7, one actuator mechanism is shown for translating one swaging blade for illustrative purposes. In one embodiment, all axially dispersed swaging blades can be translated similarly. For example, six axially located swaging blades may be similarly translated simultaneously by a mechanism for each swaging blade. FIG. 4A-B shows cam 210 connected to elongated member 220 for pushing an end of cartridge 230, which has a pivot 310, for translating one swaging blade 120 to the extended position. The actuator 200 may be activated by a knob 320 on the tool 100 being rotated in a direction around axis 330. FIGS. 5A-B show one swaging blade 120 in the extended position, after the cam 210 engages the elongated member 220 to push the cartridge 230 about pivot 310. FIG. 5B shows the top view after one swaging blade 120 is extended such that the base pivot 310, where the swaging blade 120 was previously aligned, is stationary. FIG. 6 depicts a cam mechanism 210 for actuator 200. FIG. 7 depicts a wedge mechanism 210 for actuator 200.

Having described the structure of tool 100 according to one or more embodiments, the following describes the method of using an embodiment of the tool 100 to machine a profile into an inner surface of a cylinder bore. The tool 100 is typically mounted in a machine tool spindle with an axis of rotation parallel to the cylinder bore axis, offset from the bore axis. The tool is positioned within the cylindrical bore, with fixed grooving blades and translatable swaging blades. The tool interpolates around the cylinder bore at different angular speeds about the tool axis and the bore axis. The interpolating movement permits the formation of a pocket and annular, parallel grooves within the inner surface of a cylinder bore while the swaging blades are in the retracted position. After forming the annular profile of grooves and peaks in the cylinder bore surface, the swaging blades 120 are translated to the extended position such that the swaging blades 120 interpolate over the same tool path as the grooving blades 110 to reduce positional and orientation errors. The tool 100 is maintained at an axial location along the length of the cylinder bore during the forming and deforming steps. An actuator 200 is engaged to translate the swaging blades between the retracted and extended positions. The swaging blades 120 deform the peaks after they are translated to the extended position. In the extended position, the swaging blades 120 have distal ends for deforming, which extend radially beyond the distal ends of the grooving blades 110, and produce an undercut on the peaks. Further, after deforming the peaks, the swaging blades 120 are translated back to the retracted position. The tool 100 may then be returned to a tool magazine. The tool 100 may be removed from the cylinder bore for extending and retracting the swaging blades 120.

In one or more embodiments, one of the grooving elements 110 and swaging elements 120 are translatable. For example, the grooving blades 110 may be retractable, and the swaging blades 120 fixed, such that the grooving blades are translated to the retracted position after producing the grooves and peaks in the surface. The retracted position of the grooving blades 120 is radially inward of the swaging blades 120 so that the swaging blades can deform the peaks thereafter. Similarly, in other embodiments, both the grooving blades and the swaging blades may be translatable between an extended and retracted position to form the grooves and peaks, and deform the peaks thereafter.

The machined surface after the grooving step and the swaging step has one or more advantages over other roughening processes. First, adhesion strength of the metal spray may be improved by using the swaging step instead of other secondary processes, such as diamond knurling, roller burnishing, wire brushing, or hydraulic expansion. The adhesion strength was tested using a pull test. The adhesion strength may be in the range of 40 to 70 MPa. In other variations, the adhesion strength may be 50 to 60 MPa. Compared to the adhesion strength of a diamond knurling process, the adhesion strength of swiping is at least 20% higher. Further, the Applicants have recognized that adhesion is independent of profile depth of the grooves after the first processing step. This may be advantageous for at least two reasons. The swaging blades cut relatively lower profile depths compared to conventional processes, such as diamond knurling, roller burnishing, and brushing. In certain variations, the reduction in profile depth is 30 to 40%. Accordingly, less metal spray material is necessary to fill the profile while not compromising adhesion strength. Also, any variation in the depth of the grooves does not affect the adhesion strength, which makes the swaging step more robust than conventional processes. As another benefit of one or more embodiments, the swaging step can be operated at much higher operational speeds than other processes, such as roller burnishing or diamond knurling. In addition, translating the swaging blades to the extended position for the swaging step eliminates positional errors and run out due to tool change between the grooving and swaging steps of roughening the cylinder bore surface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   positioning a cylindrical tool having a body with one or more rows of blades within a cylindrical bore having a surface, the one or more rows of blades including fixed grooving blades mounted to the body, and translatable swaging blades having a retracted position within the body and an extended position with distal ends of the translatable swaging blades being positioned radially outward from grooving blade distal ends;

forming annular grooves and peaks into the surface with the grooving blades when the swaging blades are in the retracted position within the body such that the distal ends are radially inward of a radius of the body; and translating the swaging blades from the retracted position to the extended position to deform the peaks.

2. The method of claim 1, further comprising translating the swaging blades from the extended position to the retracted position after the peaks are deformed.

3. The method of claim 1, wherein each deformed peak includes an undercut.

4. The method of claim 1, further comprising actuating an actuator configured to translate the swaging blades between the retracted position to the extended position.

5. A method comprising:
positioning a cylindrical tool at an axial location along a length of a cylinder bore having a surface, the cylindrical tool having a body with fixed grooving blades mounted about the circumference of the body and defining recesses about the circumference of the body to receive translatable swaging blades in a retracted position such that the distal ends of the translatable swaging blades are radially inward of a periphery of the body;

forming grooves and peaks into the surface at the axial location with the grooving blades when the swaging blades are in a retracted position within the recesses; and deforming the peaks with the swaging blades when the swaging blades are in an extended position at the axial location, wherein in the extended position, each distal end of each of the translatable swaging blades extend radially outward past each distal end of each of the fixed grooving blades.

6. The method of claim 5, further comprising translating the swaging blades between the retracted and extended position after the forming step.

7. The method of claim 6, further comprising actuating an actuator configured to translate the swaging blades between the retracted position and the extended position.

8. The method of claim 5, further comprising removing the tool from the cylinder bore after the deforming step.

9. A method comprising:
positioning a cylindrical tool having a body with one or more rows of elements including grooving elements and swaging elements, one of the grooving elements and swaging elements being fixed elements with distal ends positioned radially outward of a periphery of the body and the other being translatable elements movable between a retracted position with each of the translatable elements being housed in a respective recess defined in the body such that distal ends of the translatable elements are positioned radially inward of the periphery to an extended position with distal ends of the translatable elements being radially outward of the distal ends of the fixed elements;

forming grooves into a cylindrical surface with the grooving elements to form peaks therebetween; and deforming the peaks with the swaging elements.

10. The method of claim 9, wherein the swaging elements are translatable.

11. The method of claim 10, wherein the grooves are formed when the swaging elements are in the retracted position.

12. The method of claim 11, further comprising translating the swaging elements to the retracted position after the deforming step.

13. The method of claim 9, wherein the grooving elements are translatable.

14. The method of claim 13, wherein the peaks are deformed when the grooving elements are in the retracted position.

15. The method of claim 14, further comprising translating the grooving elements to the extended position after the deforming step.

16. The method of claim 9, further comprising maintaining the tool at an axial location along the length of a cylinder bore during the forming and deforming steps.

17. The method of claim 9, further comprising translating one of the grooving elements and swaging elements having the retracted and extended positions by actuating an actuator located on the tool.

18. The method of claim 9, wherein the grooving and swaging elements in each row are positioned along a circumference of the tool.

* * * * *